United States Patent
Henry et al.

[19]

[11] Patent Number: 6,066,256

[45] Date of Patent: May 23, 2000

[54] BIOLOGICAL SOLUBILIZATION PROCESS FOR CONVERTING CONTAMINATED SLUDGE INTO ENRICHED BIOSOLIDS

[76] Inventors: J. Glynn Henry, 7 Lichen Place, Don Mills, Ontario, Canada, M3A 1X3; Durga Prasad, 34 Quantrell Trail, Scarborough, Ontario, Canada, M1B 1L8

[21] Appl. No.: 09/058,188

[22] Filed: Apr. 10, 1998

Related U.S. Application Data

[60] Provisional application No. 60/043,306, Apr. 11, 1997.

[51] Int. Cl.⁷ .............................. C02F 1/62; C02F 11/02
[52] U.S. Cl. ..................... 210/614; 210/620; 210/631; 210/912
[58] Field of Search .................... 210/609–614, 210/620, 631, 912

[56] References Cited

U.S. PATENT DOCUMENTS

| | | | |
|---|---|---|---|
| 3,878,303 | 4/1975 | Hashimoto | 210/612 |
| 4,790,940 | 12/1988 | Castaldi et al. | 210/611 |
| 5,217,615 | 6/1993 | Tyagi et al. | 210/611 |
| 5,454,948 | 10/1995 | Tyagi et al. | 210/611 |
| 5,660,730 | 8/1997 | Lucchese et al. | 210/611 |

OTHER PUBLICATIONS

APHA, 1989. Standard methods for the examination of water and wastewater. 17th Ed. American Public Health Association, Washington, DC., U.S.A., 2–78, 79, 4–204–206.

Blais, J.F., Tyagi, R.D. and Auclair, J.C. 1992. Bioleaching of metals from sewage sludge by sulfur oxidizing bacteria. Environ. Eng. 118: 690–707.

Bloomfield, C. and Pruden, G. 1975. The effect of aerobic and anaerobic incubation on the extractabilities of heavy metals in digested sewage sludges. Environ. Pollut. 8:217, 230–232.

Cornwell, D.A. and Westerhoff, G.P. 1980. Extract heavy metals via liquid—ion exchange. Water and Wastes Eng. 7:36–42.

Hall, J.E. 1995. Sewage sludge production, treatment and disposal in the European Union. J. CIWEM, 9:335–343.

Hayes, T.D., Jewell, W.J. and Kabrick, R.M. 1979. Heavy metal removal from sludges using combined biological treatment. In: Proceedings 34th Industrial Waste Conference, Purdue University, Ann Arbor, Michigan, U.S.A., 529–543.

Isaac, R.A. and Broothroyd, Y. 1996. Beneficial use of biosolids: Progress in Controlling metals. Water Sci. Technol., 34:493–497.

(List continued on next page.)

*Primary Examiner*—Thomas G. Wyse
*Attorney, Agent, or Firm*—L. Anne Kinsman

[57] ABSTRACT

A continuous process for the biological solubilization of heavy metals from primary or other metal-laden sewage that utilizes indigenous sulphur oxidizing bacteria and elemental sulphur as the energy source, prevents nitrite formation and minimizes the residual sulphur remaining in the processed biosolids. The process includes the steps of: enriching indigenous sulphur oxidizing bacteria in sewage sludge in an aerobic biological reactor at or above ambient temperatures; the feeding of sludge and elemental sulphur to this reactor to achieve a steady-state characterized by a pH<3 and an oxidation-reduction potential (ORP) of +400 to +600 mV; minimizing sulphur addition to achieve the desirable minimal residual sulphur in the processed biosolids; the removal of this processed sludge mixture; the separation of liquid and biosolids components of this processed sludge mixture; the neutralization of the biosolids component of the processed sludge followed by blending with undigested primary and/or secondary sludge or in isolation, prior to further processing and/or land application.

10 Claims, 1 Drawing Sheet

OTHER PUBLICATIONS

Jacobs, L.W. 1981. Agricultural application of sewage sludge. In: Sludge and its ultimate disposal, J.A. Borchardt, W.J. Redman, G.E. Jones, and R.T. Sprangue (Eds). Ann Arbor Science Publishers Inc., Ann Arbor, Michigan, U.S.A., 109–126.

Janzen, H.H. and Bettany, J.R. 1987. Oxidation of elemental sulfur under field conditions in central Saskatchewan. Can. J. Soil Sci. 67:609–618.

Kiff, R.J. and Brown, S. 1981. The development of an oxidative acid hydrolysis process for sewage sludge detoxification. In: Proceedings Int. Conference Heavy metals in the environment, Amsterdam, The Netherlands, 159–162.

Lue–Hing, C., Zeng, D.R., Sawer, B., Guth, E. and Whitebloom, S. 1980. Industrial waste pretreatment and EPA cadmium limitations. J. Water Pollut. Control Fed., 52:2538–2551.

Lue–Hing, C., Matthews, P., Namer, J., Okuono, N. and Spinosa, L. 1996. Sludge management in highly urbanized areas. Water Sci. Technol. 34:517–524.

MAFF. 1993. Review of the rules for sewage sludge application to agricultural land: soil fertility aspects of potentially toxic elements. Report of the Agriculture, Fisheries, and Food. Cited in: Heavy Metals in Soils, 2nd Ed., B.J. Allowy, editor, Blackie Academic & Professional. An imprint of Chapman and Hall, London, U.K. p. 48.

Motowicka–Terelak, T. and Gador, J. 1986. Effect of contamination with sulfur on soil properties and crop yields in a lysimeter experiment. 1 Effect of elemental sulphur on the chemical properties of soils. Pamietnik Pulawski, 7–23.

Olyer, J.W., Kreye, W.C. and King, P.H. 1975. Heavy metals release by chlorine oxidation of sludges. J. Water Pollut. Control Fed, 47:2490–2497.

Rich, K.K. 1993. Biological solubilization of metals from anaerobically digested sludge by sulfur oxidizing bacteria. M.A.Sc. Thesis, Dept. of Civil Engineering, Univ. of Toronto, Canada, iii, B1.

Seth, R., Henry, J.G. and Prasad, D. 1997. From metal laden sludge to biosolids in a continuous biological process. Proceedings: 26th Annual WEOA Technical Symposium. London, Ontario, Canada.

Torrey, S. 1979. Sludge disposal by landspreading—An Overview. In: Sludge disposal by landspreading techniques. Ed. S. Torrey, Noyes Data Corp. Park Ridge, N.J., U.S.A. 1–18.

Tyagi, R.D., Couillard, D. and Tran, F.T. 1990. Studies on microbial leaching of heavy metals from municipal sludge. Water Sci. Technol. 22:229–238.

Tyagi, R.D., Blais, J.F., Meunier, N. and Kluepfel, D. 1993. Biolixiviation des metaux lourds et stabilisation des boues d'epuration; essai en bioecteur opere en mode cuvee. Can. J. engrg. 20:57.

Wong, L. and Henry, J.G. 1984. Decontaminating biological sludges for agricultural use. Water Sci. Technol. 17:575–586.

Wong, L. and Henry, J.G. 1988. Bacterial leaching of heavy metals from anaerobically digested sludge. In: Biotreatment systems. vol. II. D.L. Wise (ed). CRC Press. Florida, U.S.A., p. 125–169.

Zhao, F. and McGrath, S.P. 1994. Extractable sulphate and organic sulphur in soils and their availability to plants. Plant and Soil. 164:243–250.

BIOLOGICAL SOLUBILIZATION PROCESS FOR CONVERTING CONTAMINATED SLUDGE INTO ENRICHED BIOSOLIDS

This application claims benefit of U.S. Provisional application Ser. No. 60/043,306 filed Apr. 11, 1997.

FIELD OF THE INVENTION

The present invention relates to a process for the biological solubilization of heavy metals from sewage sludge utilizing indigenous sulphur oxidizing bacteria and elemental sulphur as the energy source with minimal residual sulphur remaining in the processed sludge.

BACKGROUND OF THE INVENTION

The operation of sewage treatment plants results in the generation of sizable quantities of sewage sludge. Sludge management constitutes a major portion of waste treatment plant costs. Landfilling, incineration and land application are the major routes for sludge disposal. Hence, there is a clear need for the development of innovative technologies or approaches for maintaining cost-effective disposal and/or recycling options.

Land application of "acceptable" sludge or biosolids is expanding and gaining wider acceptability because of its fertilizer value, and the economics involved. As such, the nutrient content of sludge can be exploited through its adoption as a low-cost fertilizer, and more globally through the conservation of energy and mineral resources (Hall J. E. 1995. "Sewage Sludge Production, Treatment and Disposal in the European Union", J. CIWEM 9:335–343).

However, the heavy metal content of sewage sludges is considered to be a major threat to human health and the environment. The accumulation of these metals in soils can cause plant toxicity, ground water and surface water contamination, or the transfer of increased amounts of metals from plants to humans and animals via the food chain (Torrey S. 1979. "Sludge Disposal By Landspreading Techniques", Noyes Data Corp., N.J., U.S.A.; Jacobs L. W. 1981. "Agricultural Applications of Sewage Sludge", in *Sludge And its Ultimate Disposal*, J. A. Borchardt et al. (eds.), Ann Arbor Science Publishers Inc., Anne Arbor, Mich., U.S.A.). In the 1980s, more than 50% of the sludges produced in Ontario and in the United States failed to meet the regulatory criteria for acceptable land application because of high metal concentrations (Lue-Hing C, Zeng D. R., Sawer B., Guth E. and Whitebloom S. 1980. "Industrial Waste Pretreatment and EPA Cadmium Limitations", J. Water Pollut. Control Fed. 52:2538–2551).

As a result of source control, heavy metal concentrations in sludges have decreased markedly (Lue-Hing C., Matthews P., Namer J., Okuno N and Spiizosa L. 1996. "Sludge Management In Highly Urbanized Areas", Wat. Sci. Tech. 34:517–524). However, the rate of reduction has decreased as contributions from diffuse sources have become increasingly important. With such sources difficult to control, land application of sludges is still limited (Isaac R. A. and Boothroyd Y. 1996. "Beneficial Use of Biosolids: Progress In Controlling Metals", Wat. Sci. Tech 34: 493–497; MAFF. 1993. "Review Of The Rules For Sewage Sludge Application To Agricultural Land: Soil Fertility Aspects Of Potentially Toxic Elements", *Report of the Independemt Scientific Committee, Ministry of Agriculture, Fisheries and Food*, London, U.K.).

Most of the metal contamination in sewage sludge is associated with the solids fraction thereof. Thus, decontamination and removal require that the metals be first solubilized. Various chemical methods for the solubilization of metals from sludge have been investigated. These include: acidification (Hayes T. D., Jewell W. J. and Kabrick R. M. 1979. "Heavy Metal Removal From Sludges Using Combined Biological/Chemical Treatment", in *Proceedings 34th Industrial Waste Conference*, Purdue University, Ann Arbor, Mich., U.S.A.); chemical chelation (Bloomfield C. and Pruden G. 1975. "The Effects of Aerobic and Anaerobic Incubation On the Extractabilities of Heavy Metals in Digested Sewage Sludges", Environ. Pollut. 8:217); liquid ion exchange (Cornwell D. A. and Westerhoff G. P. 1980. "Extract Heavy Metals Via Liquid-Ion Exchange", Water and Wastes Eng. 17:36); chlorination (Olver J. W., Kreye W. C. and King P. H. 1975. "Heavy Metals Release By Chlorine Oxidation of Sludges", J. Water Pollut. Control Fed. 47:2490); and oxidative acid hydrolysis (Kliff. R.J. and Brown S. 1977. "The Development Of An Oxidative Acid Hydrolysis Process For Sewage Sludge Detoxification", in *Proc Int. Conf. Heavy Metals in the Environment*, Amsterdam, The Netherlands). Wong and Henry (Wong L. and Henry J. G. 1988. "Bacterial Leaching of Heavy Metals From Anaerobically Digested Sludge", in *Biotreatment Systems Vol. II*, D. L. Wise (ed.), CRC Press, Florida, U.S.A.) compared these five methods and concluded that none was suitable for full-scale application because of cost and operational constraints, and in some cases, unacceptable removal efficiencies.

A biological process for metal solubilization exploiting the presence of indigenous sulphur oxidizing bacteria that use elemental sulphur as their energy source has been developed (Blais J. F., Tyagi R. D. and Auclair J. C. 1992. "Bioleaching of Metals From Sewage Sludge by Sulfur-Oxidizing Bacteria", J. Environ Eng. 118: 690–707; Rick K. K. 1993. "Biological Solubilization of Metals From Anaerobically Digested Sludge in A Semicontinuous System", M.A.Sc. Thesis, Dept. of Civil Engineering, Univ. of Toronto, Toronto, Canada), and has been the subject matter of several patents (U.S. Pat. Nos. 5,217,615; 5,454,948). Moreover, the process seems to be cost-effective with no loss of fertilizer value in the decontaminated biosolids product (Wong L. and Henry J. G. 1988. "Bacterial Leaching of Heavy Metals From Anaerobically Digested Sludge", Biotreatment Systems (D. L. Wise, Ed.), CRC Press Inc., Boca Raton, U.S.A., p. 125; Tyagi R. D., Couillard D. and Tran F. T. 1990. "Studies On Microbial Leaching of Heavy Metals From Municipal Sludge", Water Sci. Tech. 22:229)

However, studies have shown that about 40–60% of the sulphur added is not oxidized during the process (Tyagi R. D., Blais J. F., Meunier N. and Kluepfel D. 1993. "Biolixiviation Des Métaux Lourds Et Stabilisation Des Boues D'épuration; Essai En Bioréteur Opéré En Mode Cuvée", Can. J. Civ. Engrg. 20: 57–64). Environmental problems such as soil acidification could occur on land application of the decontaminated biosolids due to acid generation from this residual sulphur (Janzen H. H. and Bettany J. R. 1987. "Oxidation of Elemental Sulfiur Under Field Conditions in Central Saskatchewan", Can. J. Soil Sci. 67: 609–618; Motowicka—Terelak T. and Gador J. 1986. "Effect of Contamination with Sulphur on Soil Properties and Crop Yields in A Lysimetric Experiment. I. Effect of Elemental Sulphur on the Chemical Properties of Soils", Pamietnik pulawski: 7–23).

With respect to the commercial application of such processes, there exist a number of other deficiencies. These include: (a) the shortcomings of the batch process; (b) the difficulty in separating the leached biosolids from the metal contaminated liquid; (c) the detrimental effects of excess sulphur addition; and (d) the large volume that must be leached when all the sludge from a wastewater treatment plant is included.

These problems are further described in the following sections.

(a) Batch Process

Prolonged aeration of sludge in a batch or sequencing batch bacterial leaching process may result in the conversion of ammonia nitrogen into nitrite nitrogen and not nitrate nitrogen as might be expected. Since nitrite is toxic to sulphur oxidizing bacteria, leaching efficiency decreases dramatically, making the process ineffective.

(b) Liquid/Solids Separation

After metal solubilization, the contaminated liquid and the leached biosolids must be separated, and the biosolids thickened and dewatered. This is a weak link in the leaching process. Wong and Henry (Wong L. and Henry J. G. 1984. "Decontaminating Biological Sludges For Agricultural Use", Water Sci. Technol. 17:575) have demonstrated that simple gravity settling is inadequate and that centrifagation is the only practical dewatering method capable of achieving the necessary 20% solids concentration needed for maximizing fertilizer value. Unfortunately high centrifugation costs make this process economically unattractive.

(c) Sulphur Addition

Elemental sulphur is the essential energy source for the sulphur oxidizing bacteria As such, the amount provided in any process is critical. Too little and leaching proceeds slowly resulting in nitrite formation and inhibition of the leaching bacteria By contrast, if excess sulphur is added to hasten acidification, and thus avoid nitrite formation in the batch or sequencing batch process, the residual sulphur in the decontaminated sludge can create acid conditions in the agricultural land on which the sludge is applied.

This problem has been identified in U.S. Pat. Nos. 5,454, 948. 5,454,948 relates to a semi-continuous (i.e. sequencing) batch process. In the example presented in that patent, sulphur oxidation efficiencies varied between 6.2% and 56.2%, leaving excessive amounts of residual sulphur in the metal decontaminated sludge. U.S. Pat. No. 5,454,948 suggests the use of sulphur pellets or "immobilized sulphur" in order to facilitate recovery and recycling of excess residual sulphur. However, the process of preparing "immobilized sulphur" is complicated and the economics involved were not addressed.

Residual sulphur in decontaminated sludge is not totally undesirable. After nitrogen and phosphorus, sulphur is the third most important nutrient for plants and crops. However, the sulphur content in decontaminated sludge needs to be controlled so that it is in balance with the other nutrients.

(d) Sludge Type and Quantity

Most research on heavy metal decontamination of sewage sludge has been based on the total sludge volume, both primary and secondary, removed from wastewater treatment processes. Traditionally, this ensured that all metal contaminated sludges were included in the leaching process. Different sludge types, namely, primary, secondary, digested, etc., obtained from various treatment plants have been evaluated for metal solubilization (Blais J. F., Tyagi R. D. and Auclair J. C. 1992. "Bioleaching of Metals From Sewage Sludge By Sulfur-Oxidizing Bacteria", J. Environ. Eng. 118:690–707). However, no comparison has been made between the different sludge types obtained from the same treatment plant for their relative suitability for metal removal by the biological solubilization process.

Therefore, there is a clear need for an improved process for the biological decontamination of metal-laden sewage sludge which addresses these deficiencies in the prior art.

SUMMARY OF THE INVENTION

The disadvantages of the prior art may be overcome by providing an improved process for the biological decontamination of heavy metals from metal-laden sewage sludge.

It is desirable to provide a decontamination process in which the treated sludge (i.e. biosolids), can be beneficially reused as fertilizer or fertilizer amendment.

It is desirable to provided a metal decontamination process which overcomes the inadequacies of batch processes by incorporating an intermittent and/or continuous feed schedule for untreated metal-laden sewage, minimizing the sulphur required in the process, optimizing heavy metal solubilization from undigested primary or other sewage sludges, eliminating nitrite formation and the attendant microbiological inhibition and incorporating a more effective gravity thickening of treated sludge thus enabling sludge recycling with a concomitant reduction in the retention time needed for metal solubilization, and a facilitation of sludge dewatering.

Accordingly, this invention encompasses the following beneficial features:

i) a process for the decontamination of metal-laden sewage sludge encompassing an intermittent or continuous feed schedule, by contrast to batch or sequencing batch reactor processing;

ii) the prevention of nitrite formation, and thus the prevention of attendant inhibition of sulphur oxidizing bacteria;

iii) the minimization of residual sulphur in the decontaminated processed sludge;

iv) the optimization of the separation of the biosolids fraction from the associated liquid fraction containing the solubilized metal(s) following processing;

v) the improvements in sulphur oxidation efficiency in the decontamination process;

vi) the optimization of the efficiency of metal solubilization from sewage sludge.

According to one aspect of the invention, there is provided a process for the solubilization of heavy metals in sewage utilizing indigenous sulphur oxidizing bacteria and elemental sulphur as the energy source.

According to another aspect of the invention, there is provided a process for the generation of heavy metal-decontaminated biosolids from sewage sludge possessing minimal levels of residual sulphur.

According to another aspect of the invention, there is provided a biological method for the solubilization of metals (Metal Solubilization step) in sewage sludge comprising the steps of:

i) enriching the indigenous acidophilic, sulfur oxidizing bacteria in a biological reactor. This is achieved by mixing metal-laden sludge and powdered elemental sulphur and incubating it in the reactor at or above ambient temperature, under aerobic conditions until a pH<3 and oxidation—reduction potential (ORP) between +400 to +600 mV is obtained;

ii) continuously or intermittently feeding the mixture of fresh metal-laden sludge and powdered elemental sulphur to this reactor;

iii) operating the reactor at a steady state characterized by a pH<3 and an ORP of 400 to 600 mV.

iv) in the intermittently-fed process, maintaining the frequency of sludge-sulphur mixture additions so that the pH of the reactor contents does not exceed 4.0 after each addition;

v) optimizing sulfur addition and hydraulic retention time (HRT) in the process to achieve minimal residual sulfur in the processed mixture when required;

vi) continuously or intermittently removing the mixture from the reactor in step (iii) (at a rate depending on the required HRT) for further processing.

According to another aspect of the invention there is a method for the separation of liquid and solid components of the processed sludge comprising the steps of:

i) the addition of an acid tolerant cationic polymer to the processed sludge, or a fraction thereof, to form a polymer-liquid-biosolids mixture;

ii) allowing the biosolids and polymer-liquid components of said mixture to partially separate and settle via gravity;

iii) the centrifugation of said partially settled mixture;

iv) the separate removal of the biosolids and polymer-liquid components of said mixture for further processing.

According to another aspect of the invention there is a method for the neutralization of decontaminated biosolids obtained from processed sludge prior to further disposal and/or processing.

According to another aspect of the invention there is a method for the blending of decontaminated biosolids with unprocessed metal-laden primary and/or secondary sewage sludge, to obtain metals reduced biosolids which meet local regulatory guidelines for exceptional quality biosolids, the said blended mixture subsequently being neutralized prior to further disposal and/or processing.

DETAILED DESCRIPTION OF THE INVENTION

Figure 1:
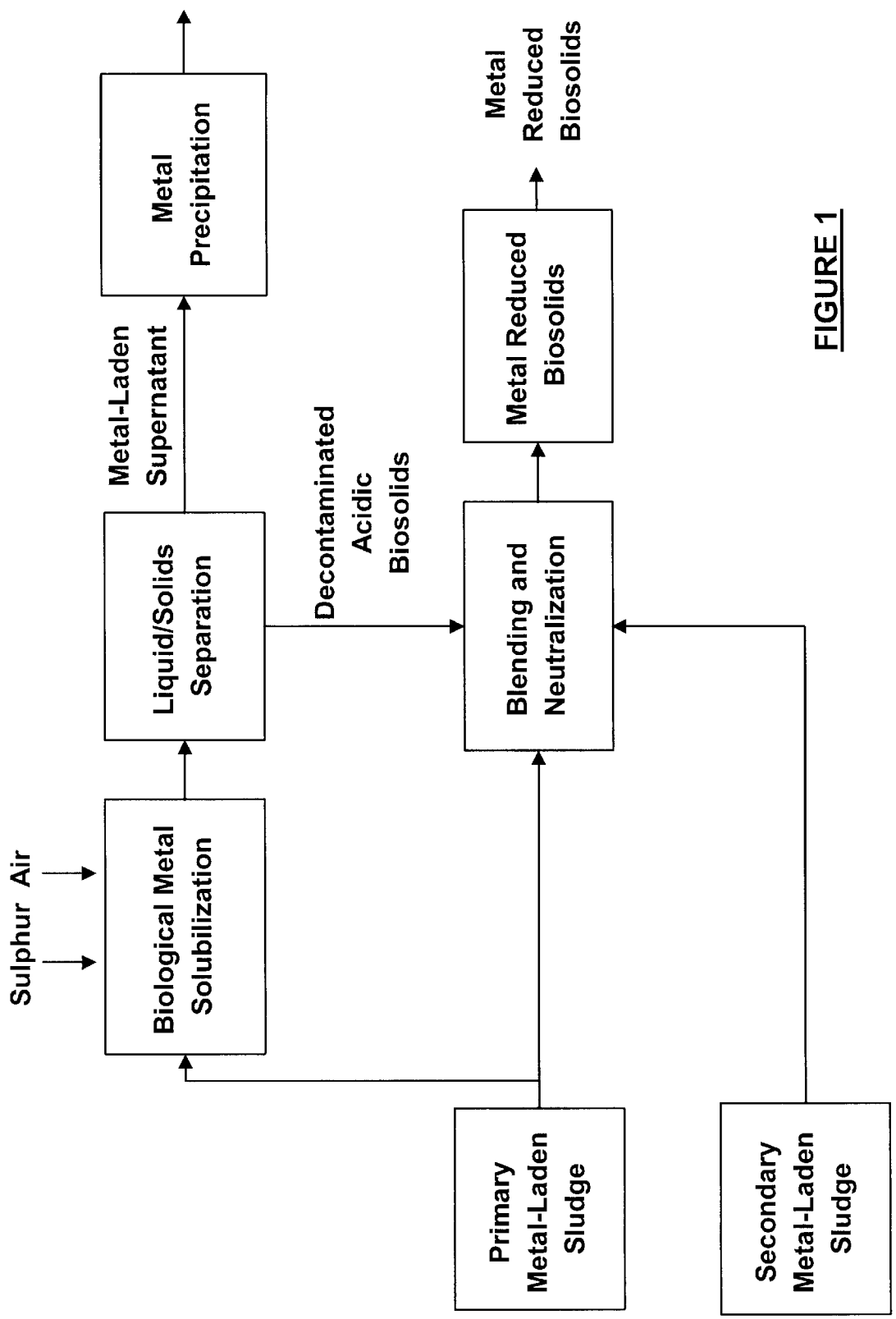
FIG. 1 is a schematic view illustrating a process flow diagram of the present invention for the solubilization of heavy metals in sewage sludge utilizing indigenous sulphur oxidizing bacteria and elemental sulphur as the energy source, with minimal residual sulphur remaining in the processed sludge.

The present invention relates to a process for the biological solubilization of toxic heavy metals in sewage sludge utilizing indigenous acidophilic sulphur oxidizing bacteria and elemental sulphur as the energy source, with minimal residual sulphur remaining in the processed sludge.

A continuous or intermittent sludge feed process incorporates the following: a minimization of sulphur required for the processing of sewage sludge; the elimination of nitrite formation, and thus the attendant inhibition of sulphur oxidizing bacteria; an effective gravity thickening of processed sludge thus enabling sludge component recycling, and a reduction in sludge retention time in the metal solubilization process.

FIG. 1 illustrates the component features of the preferred embodiment of the sludge decontamination process.

Primary sludge (or other metal-laden sludge), mixed with elemental sulfur is allowed to obtain a steady state condition in a biological process for solubilization of metals. This steady state is characterized by a pH of less than 3, and an oxidation-reduction potential (ORP) ranging from +400 to +600 mV. This steady state is achieved under aerobic conditions at or above ambient temperatures.

Following attainment of this steady state, unprocessed metal-laden sludge supplemented with low levels of elemental sulfur (S), is fed into the Biological Solubilization process step on a continuous or intermittent schedule. The amount and scheduling of this addition of unprocessed sludge is such that the pH in the Biological Solubilization process step does not exceed a value of 4. The step of Biological Solubilization is conducted in a reactor under aerobic conditions at or above ambient temperatures.

In the Liquid/Solids Separation step, the gravity separation of the biosolids fraction from the solubilized-metal liquid fraction is facilitated through the addition of acid tolerant cationic polymer. Following an initial period of gravity settling, final separation and dewatering is achieved via centrifugation.

The solubilized-metal liquid fraction is subsequently processed for metal precipitation and/or recovery by a variety of means well known in the art.

The decontaminated acidic biosolids fraction is subsequently neutralized prior to further use and/or disposal. Alternatively, the decontaminated acidic biosolids fraction can be blended with unprocessed primary and/or secondary metal-laden sludge prior to neutralization.

The following example further illustrates the present invention and is demonstrative for the biological metal decontamination process. However, it should be understood that the specific details set forth in the example are merely illustrative and are not meant to be limiting.

EXAMPLE

The characteristics of the primary and secondary sewage sludge obtained from the Main Sewage Treatment Plant in Metropolitan Toronto and used in this study are presented in Table 1. The sludges were stored at 5° C. Prior to use these sludges were sieved using a U.S. standard sieve #14 to remove coarse particles, and diluted with water to adjust total solids (TS) to about 2%.

TABLE 1

CHARACTERISTICS OF THE SLUDGES USED

| | Sludge | |
|---|---|---|
| Characteristics | Primary | Secondary |
| pH | 6.1 | 7.0 |
| Solids (g/L) | | |
| Total | 35.0 | 33.1 |
| Volatile | 23.5 | 17.9 |
| Total suspended | 30.8 | 31.8 |
| Volatile suspended | 20.8 | 16.9 |
| Metals (mg/kg) | | |
| Copper | 830 | 1710 |
| Zinc | 660 | 1270 |
| Cadmium | 11 | 23 |
| Nickel | 80 | 120 |
| Chromium | 240 | 430 |

The intermittently-fed biological process was studied in 1 L shake flasks (working volume=350 mL) mounted on a gyratory shaker set at 200 rpm. Separate flasks, termed F1 and F2, were used for primary and secondary sludges. The flasks were started with 310 mL sludge (TS=2%) and 40 mL inoculum obtained from earlier batch studies, and supplemented with 2 g elemental sulphur ($S^0$)/L. The pH in both F1 and F2 dropped to around 2.0 in 14 days. Intermittent feeding (once-a-day) of the flasks was then commenced on Day 14 with sludge (TS=2%) supplemented with 2 g powdered elemental sulphur ($S^0$)/L. Distilled water was added daily to compensate for moisture losses from the flasks.

Total and volatile suspended solids (TSS and VSS) were determined by centriftiging 20 mL of sample (1400×g for 10 minutes) and recovering the pellet for determination of TSS and VSS as per Standard Methods (APHA. 1989. "Standard Methods for the Examination of Water and Wastewater", 16th Ed., American Public Health Association, Washington, D.C., U.S.A.). Total and volatile solids (TS and VS) were determined as per Standard Methods (APHA, 1989). Prior to sulphate analysis, a 10 mL sample was extracted with 10 mL 0.016 M $KH_2PO_4$ (Zhao F. and McGrath, S. P. 1994. "Extractable Sulphate and Organic Sulphur in Soils and Their Availability to Plants", Plant and Soil 164: 243–250), to solubilize any complexed sulphate. Sulphate was determined according to standard procedures (APHA, 1989), as modified by Rich (Richs K. K. 1993. "Biological Solubilization of Metals From Anaerogically Digested Sludge in A Semicontinuous System", M.A.Sc. Thesis, Dept. of Civil Engineering, Univ. of Toronto, Toronto, Canada). Sulphur oxidation was estimated based on the sulphate produced. The concentration of metals in the whole sludge (total) and liquid fraction (soluble) were determined. The liquid fraction was separated from the solid fraction by centrifugation (Sorvall Inc., model SS-3 Automatic) at 2300×g for 20 min. Both the liquid and solid fractions samples were digested by overnight refluxing at low heat with a mixture of $HNO_3$ and HCl and filtered through a glass fibre filter paper (Whatman GF/A) before analysis. The pH and oxidation-reduction potential (ORP) were measured using an Orion Research Ionalyzer (Model 701A). A platinum redox electrode(Orion Research, Model 97-78-00) was used to measure ORP.

Flasks F1 and F2, containing undigested primary and secondary sludges respectively, were operated in the intermittent feed mode for 4 weeks. The performance of both flasks was very stable and a pH of around 2.0 was maintained throughout the run. The intermittent once-a-day feeding regimen commencing on Day 14 was frequent enough to prevent the pH from exceeding 4.0 after said daily additions of unprocessed sludge. The steady-state results of the intermittently-fed process for the two sludges are presented in Table 2.

TABLE 2

STEADY-STATE CHARACTERISTICS OF THE BIOLOGICAL SOLUBILIZATION PROCESS

| Sludge | pH | ORP (mV) | Sulphur Oxidized (%) | Residual Biosolids Sulphur (mg/L) |
|---|---|---|---|---|
| Primary | 2.0 | +585 | 82 | 360 |
| Secondary | 2.2 | +585 | 82 | 360 |

As demonstrated by these results, the performances of the process with either primary or secondary sludge were very similar. Sulphur oxidation efficiency of about 82% was achieved with both sludge types.

The low residual sulphur concentration of approximately 360 mg/L in the decontaminated biosolids is not expected to be detrimental to land application. In fact, this residual sulphur may enhance the value of the decontaminated biosolids as a sulphur-fertilizer for nutrient deficient soils.

The metal solubilization efficiencies at steady-state during the intermittently-fed process for primary and secondary sludges are presented in Table 3.

TABLE 3

METAL SOLUBILIZATION EFFICIENCIES

| | Solubilization Efficiency (%) | |
|---|---|---|
| Metal | Primary Sludge | Secondary Sludge |
| Cu | 73 | 65 |
| Zn | 90 | 85 |
| Cd | 80 | 57 |
| Ni | 60 | 40 |
| Cr | 55 | 30 |

As demonstrated by the results of Table 3, the metal solubilization efficiencies with primary sludge were greater than those with secondary sludge. Since primary sludge represents perhaps 55% of the total quantity of sludge from a conventional activated sludge wastewater treatment plant, and may typically contain up to 90% of the total metal content of concern, there are clear and substantial economic benefits in restricting the decontamination processing to primary raw sludge. The process could also be operated in a continuous mode as demonstrated by Seth et al. (1997).

The results presented above indicate that the continuous or intermittently-fed biological metal-decontamination process disclosed in this invention effectively solubilizes metals from sewage sludges while maintaining low residual sulphur levels in the resultant decontaminated biosolids.

Those skilled in the art will recognize that the mean residence time of the unprocessed sludge in the Biological Solubilization step, and/or the precise characteristics of the steady state achieved therein, may vary between individual applications. In addition, factors such as the specific quantities of elemental sulphur and/or metal-laden sludge fed into the process, and/or the scheduling of this feeding regimen, and/or the operating temperature may also nominally affect some parameters of the disclosed invention.

Although the invention has been described in the preferred embodiment, it is to be understood that variations and modifications may be resorted to as will be apparent to those skilled in the art. Such variations and modifications are to be considered within the purview and the scope of the claims appended hereto.

We claim:

1. A continuous process for the biological solubilization of heavy metals in sewage sludge utilizing indigenous sulphur oxidizing bacteria and elemental sulphur as an energy source, which results in a treated sludge possessing a minimal residual sulphur, wherein said process comprises the steps of:

(i) enriching the said acidophilic sulphur-oxidizing bacteria in a biological reactor by mixing metal-laden sludge and powdered elemental sulphur and incubating the mixture at or above ambient temperature under aerobic conditions until a pH<3 and an oxidation-reduction potential (ORP) between +400 to +600 mV is obtained;

(ii) continuously feeding a mixture of fresh metal-laden sludge and powdered elemental sulphur to this reactor;

(iii) maintaining aerobic conditions and operating the biological reactor to allow the said bacteria to achieve a steady state characterized by a pH<3 and an oxidation-reduction potential (ORP) ranging from approximately +400 to 600 mV;

(iv) optimizing sulphur addition to achieve minimal residual sulphur in the biosolids; and (v) continuously recovering the mixture from the reactor for further processing.

2. The continuous process as claimed in claim 1 wherein the mixture removed in step (v) is separated into constituent liquid and solid components comprising the steps of:

(a) a adding an acid tolerant cationic polymer to the mixture to form a polymer-liquid-biosolids mixture;

(b) allowing the biosolids and polymer-liquid components of said polymer-liquid-biosolids mixture to partially separate and settle under gravity and removing the polymer-liquid component for further processing leaving behind a partially settled mixture;

(c) centrifuging said partially settled mixture;

(d) separately removing the centrifuged biosolids and polymer-liquid components of said mixture for further processing.

3. The continuous process as claimed in claim 2 wherein the polymer-liquid component is processed for metal recovery and/or precipitation.

4. The continuous process as claimed in claim 2 wherein the biosolids component comprises decontaminated acidic sludge and is pH neutralized prior to further processing.

5. The continuous process as claimed in claim 2 wherein the biosolids component comprises decontaminated acidic sludge and is blended with unprocessed metal-laden primary sludge, said blended mixture is pH neutralized prior to further processing.

6. The continuous process as claimed in claim 2 wherein the biosolids component comprises decontaminated acidic sludge and is blended with unprocessed metal-laden secondary sludge and the blended mixture is pH neutralized prior to further processing.

7. The continuous process claimed in claim 1, wherein said process is continuously fed.

8. The continuous process claimed in claim 1, wherein said process is intermittently- fed.

9. The continuous process in claim 1, wherein said metal-laden sludge contains iron.

10. The continuous process in claim 1, wherein said step of continuously recovering occurs at the same rate as said feeding.

* * * * *